(12) United States Patent
Parruck et al.

(10) Patent No.: US 6,965,603 B1
(45) Date of Patent: Nov. 15, 2005

(54) CIRCUITS FOR COMBINING ATM AND PACKET DATA ON AN OPTICAL FIBER

(75) Inventors: Bidyut Parruck, Cupertino, CA (US); Joseph A. Nguyen, San Jose, CA (US); Chulanur Ramakrishnan, Saratoga, CA (US)

(73) Assignee: Cortina Systems, Inc., Mountain View, CA (US)

( * ) Notice: Subject to any disclaimer, the term of this patent is extended or adjusted under 35 U.S.C. 154(b) by 0 days.

(21) Appl. No.: 09/528,802

(22) Filed: Mar. 20, 2000

(51) Int. Cl.[7] ............................................. H04L 12/56
(52) U.S. Cl. ................................... 370/395.5; 370/466
(58) Field of Search ....................... 370/395.5–395.53, 370/395.6, 535–542, 465–466, 469, 473, 370/474

(56) References Cited

U.S. PATENT DOCUMENTS

| | | |
|---|---|---|
| 4,885,744 A | 12/1989 | Lespagnol et al. |
| 4,893,306 A | 1/1990 | Chao et al. |
| 5,144,619 A | 9/1992 | Munter |
| 5,331,451 A | 7/1994 | Mozer |
| 5,420,858 A | 5/1995 | Marshall et al. |
| 5,426,527 A | 6/1995 | Steen et al. |
| 5,450,411 A | 9/1995 | Heil |
| 5,506,714 A | 4/1996 | Nishio |
| 5,544,161 A | 8/1996 | Bigham et al. |
| 5,568,300 A | 10/1996 | Ishibashi |
| 5,602,853 A | 2/1997 | Ben-Michael et al. |
| 5,606,559 A | 2/1997 | Badger et al. |
| 5,625,625 A | 4/1997 | Oskouy et al. |
| 5,734,653 A | 3/1998 | Hiraiwa et al. |
| 5,764,642 A | 6/1998 | Chambers et al. |
| 5,781,320 A | 7/1998 | Byers |
| 5,781,549 A | 7/1998 | Dai |
| 5,822,321 A | 10/1998 | Petersen et al. |
| 5,856,975 A | 1/1999 | Rostoker et al. |
| 5,864,554 A | 1/1999 | Rostoker et al. |
| 5,872,784 A | 2/1999 | Rostoker et al. |
| 5,880,864 A | 3/1999 | Williams et al. |
| 5,887,187 A | 3/1999 | Rostoker et al. |
| 5,889,773 A | 3/1999 | Stevenson, III |
| 5,914,955 A | 6/1999 | Rostoker et al. |
| 5,917,815 A | 6/1999 | Byers et al. |
| 5,920,412 A | 7/1999 | Chang |
| 5,930,477 A | 7/1999 | Uchida |
| 5,933,426 A | 8/1999 | Motoori |
| 5,936,965 A | 8/1999 | Doshi et al. |
| 5,946,309 A | 8/1999 | Westberg et al. |
| 5,959,994 A | 9/1999 | Boggs et al. |
| 5,995,516 A | 11/1999 | Iwasaki et al. |
| 6,002,692 A | 12/1999 | Wills |
| 6,018,521 A | 1/2000 | Timbs et al. |
| 6,032,190 A | 2/2000 | Bremer et al. |
| 6,046,999 A | 4/2000 | Miki et al. |
| 6,052,383 A | 4/2000 | Stoner et al. |
| 6,052,386 A | 4/2000 | Achilleoudis et al. |
| 6,075,788 A | 6/2000 | Vogel |
| 6,084,881 A | 7/2000 | Fosmark et al. |
| 6,778,561 B1 * | 8/2004 | Jha ............................. 370/537 |

\* cited by examiner

*Primary Examiner*—Chi Pham
*Assistant Examiner*—Thai Hoang

(57) ABSTRACT

An architecture for transmitting both ATM cells and data packets via a single optical fiber and for receiving ATM cells and data packets via a single optical fiber. The architecture includes both a transmission convergence device (TCD) circuit and a segmentation-and-reassembly (SAR) circuit and is implemented as integrated circuits, preferably as part of a router to eliminate the need for a SONET multiplexer.

9 Claims, 8 Drawing Sheets

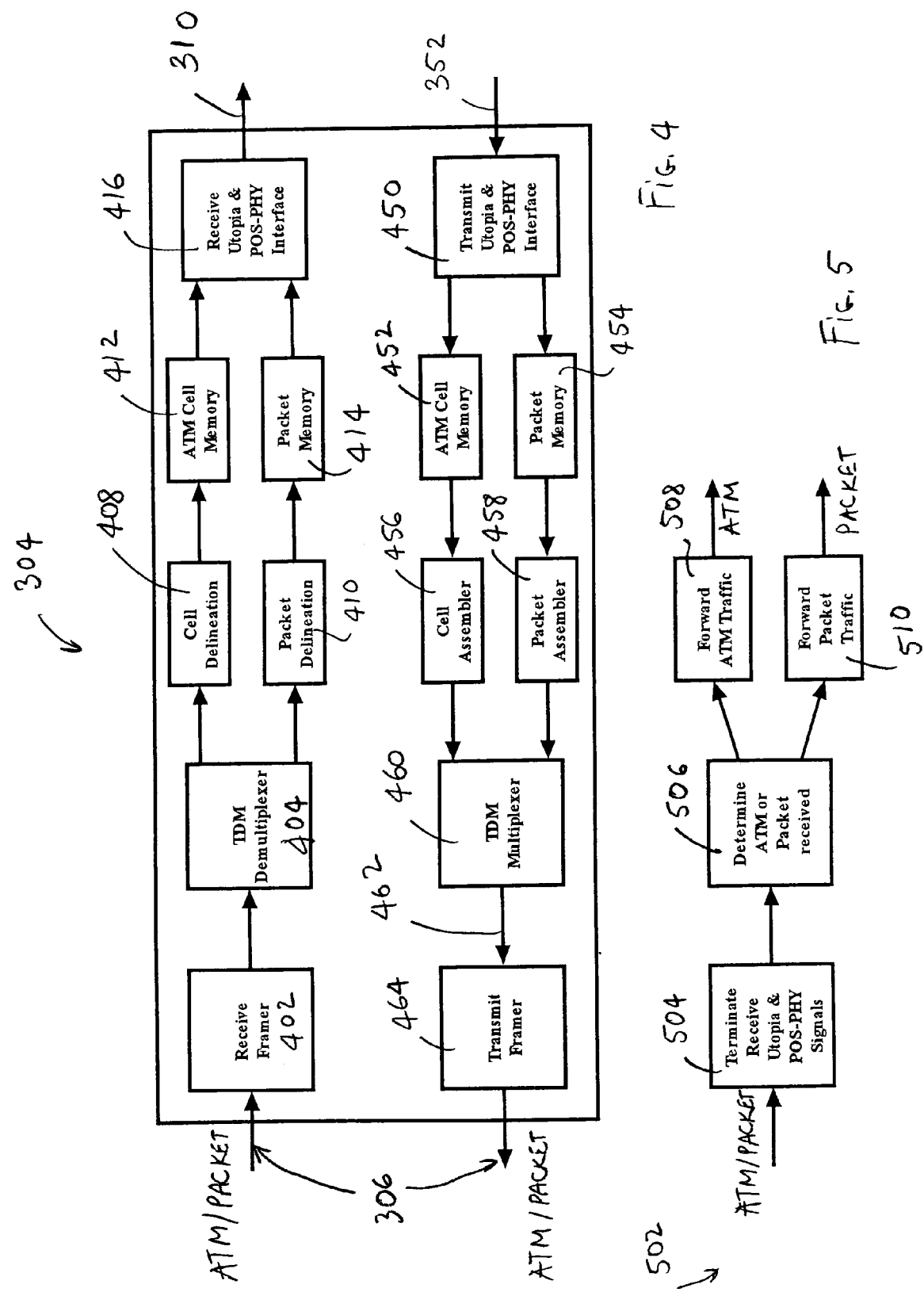

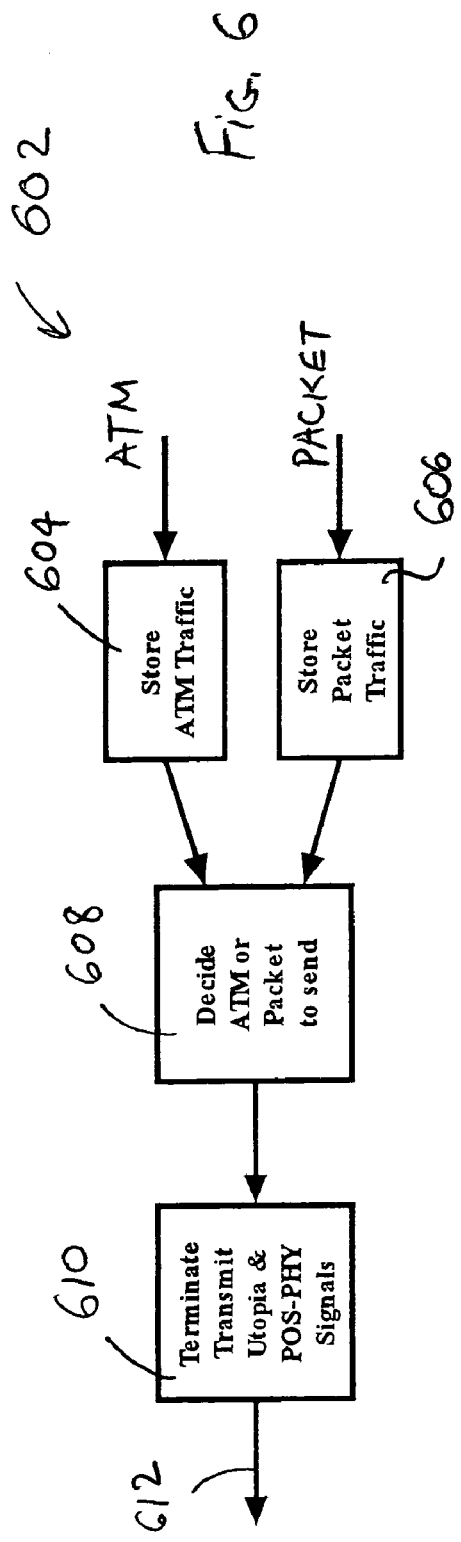
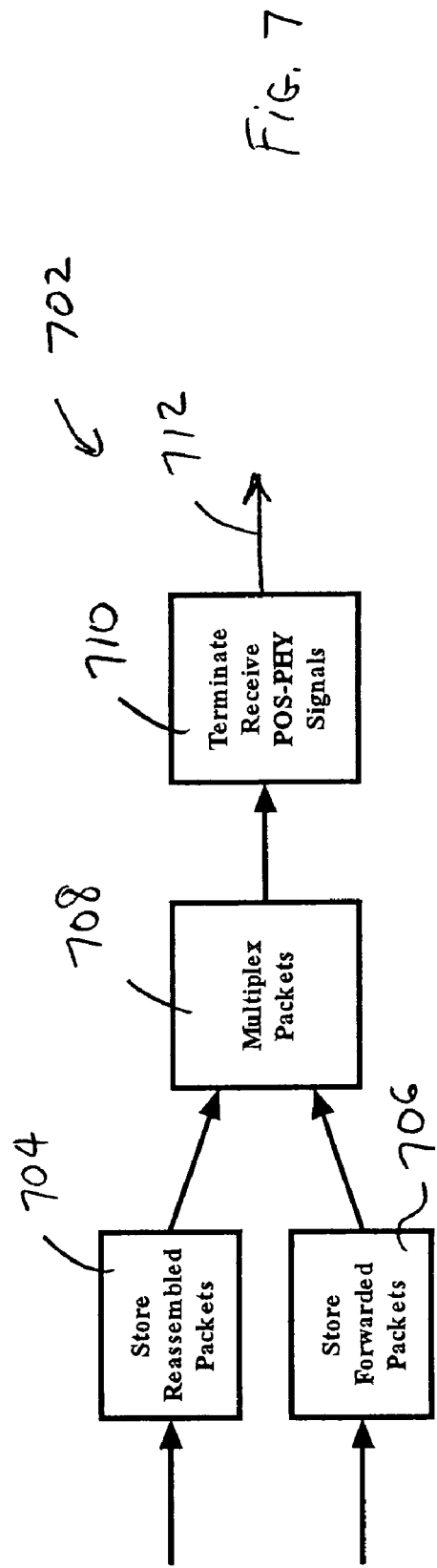

CIRCUITS FOR COMBINING ATM AND PACKET DATA ON AN OPTICAL FIBER

BACKGROUND OF THE INVENTION

The present invention relates to improved techniques for facilitating the transmission of data among disparate communication networks. More particularly, the present invention relates to improved devices and methods for facilitating transmission of packet data traffic and ATM data traffic on a single communication link.

With the information revolution and particularly with the rise of the Internet and the voice/data/video convergence, the volume of data to be sent and received over various communication networks have increased exponentially in recent years. Data, as the term is utilized in the present invention, relates to digital data that may be employed to carry voice, video, or any other information (such as text, graphics, and the like) that can be represented as a digital signal. To cope with the exponential increase in the amount of data being transmitted and received, network technologies have evolved as well. Nowadays, two dominant network technologies have emerged: packet-based technology and asynchronous transfer mode-based (ATM) technology. Packet technology includes TCP/IP, token ring, etc. One example of packet technology is IP (Internet Protocol) packets transmitted over OSI layer 2. Another example of packet technology is Ethernet. ATM technology is well known and well defined and will not be elaborated further here.

For a while, it appears that ATM may be the dominant technology for future communication networks. Accordingly, many businesses spent heavily to convert their existing networks to ATM technology. The emergence of the Internet has caused many to rethink their network strategy, and nowadays, many believe that packet-based technologies represent the wave of the future. Accordingly, some of the earlier adopters of ATM technology, as well as new customers, have chosen packet-based technology as their preferred networking technology. As a result, the customer base currently employs both ATM technologies and packet-based technologies. For data communication among these customers to take place seamlessly, a translation device is required.

In the prior art, one of the devices that translates between ATM data and packet data is generally known as a segmentation-and-reassembly (SAR) engine. The SAR engine typically resides at a location in the network where data from different customers and/or subnetworks is switched. FIG. 1A illustrates an Internet service provider 100, representing one such location in the current network where SAR engines may be found. Referring now to FIG. 1A, a portion of the communication network for allowing Internet users 102 to access the Internet 104 is shown. For the purpose of the present example, Internet users 102 are shown accessing the Internet through either phone lines 106 or DSL (Digital Subscriber Lines) 108, although other access technologies may also be utilized with the present invention.

In the case of phone lines 106, the user typically achieves Internet access through a dial-up connection. Multiple dial-up connections are aggregated at a circuit switch 110, which time-division multiplexes data from a plurality of dial-up connections into a (TDM) time-division-multiplexed stream to be transmitted via a TDM link 112. The TDM link 112 is terminated at a modem bank 114, which converts the TDM data into packet data for transmission through a wide area network packet link, such as frame relay link 115.

As shown in FIG. 1A, frame relay link 115 terminates at an access router 140, which routes data from multiple frame relay links onto an internal packet link, such as an Ethernet link 142. Ethernet link 142 represents the internal local connection within ISP 100, which interconnects among its server computers (not shown to simplify the illustration). Ethernet link 142 connects with a backbone router 144 as shown, which then routes the data received from the Ethernet link(s) to either a backbone packet link 146 (which may be, for example, packet over SONET or packet over DWDM) or a backbone ATM link 148 for transmission out to Internet 104. One skilled in the art should readily appreciate that the aforementioned steps are reversed when data destined for a user on one of dial-up connections 106 is received at ISP 100 from the Internet 104 through either backbone ATM link 148 or backbone packet link 146.

In the case of DSL lines 108, the individual DSL lines are terminated at a DSL Access Multiplexer 116, which combines the DSL data from a plurality of DSL channels into an ATM stream to be transmitted via an ATM link 118 to an ATM switch 120. ATM switch 120 multiplexes data from various ATM links 118 for transmission via a wide area network ATM link such as ATM link 122. As in the case of frame relay link 115, ATM link 122 also couples to an access router of ISP 100, shown in FIG. 1A as access router 160. However, because the packet-oriented protocol on Ethernet link 162 internal to ISP 100 is different from the ATM protocol on ATM link 122, a translation device is necessary. That translation device is shown in FIG. 1A as the segmentation-and-reassembly (SAR) engine 164. SAR 164 will be discussed in greater detail in FIG. 3 below.

Once the data on ATM link 122 is translated into packet-oriented data and routed to backbone router 144 (via Ethernet link 162 and the server computers of ISP 100), the data is then routed by backbone router 144 to either a backbone packet link 146 or a backbone ATM link 148 for transmission out to Internet 104. In the case wherein data is routed to ATM link 148 from ISP 100, the packet-oriented data is translated via a SAR 170 to ATM cells. One skilled in the art should readily appreciate that the aforementioned steps are reversed when data destined for a user on one of DSL connections 108 is received at ISP 100 from the Internet 104 through either backbone ATM link 148 or backbone packet link 146.

As seen in FIG. 1A, two physical backbone links (comprising at least four separate optical fibers since each optical fiber carries information in only a single direction) are required to allow ISP 100 to handle both ATM traffic and packet-oriented traffic. At the cost of tens of thousands of dollars to purchase and/or lease each optical fiber to implement each backbone link (such as backbone packet link 146 or backbone ATM link 148), this arrangement imposes a high economic burden on ISP operators and other network operators. The high cost for these separate optical links are also hard to justify in view of technologies such as dense wave division multiplex (DWDM), which allows an existing optical fiber to carry much more data per optical fiber than possible previously. Thus, some ISP may find that they still need to bear the economic burden of paying for two fibers in each direction in order to accommodate both ATM traffic and packet-oriented traffic when neither fiber may be employed at anywhere near their full bandwidth capacity.

In the prior art, one of the backbone links may be eliminated through the use of a SONET (synchronous optical network) multiplexer. As shown in FIG. 1B, a SONET multiplexer 192 is located at the Internet-side of ISP 100 and is coupled to both backbone packet link 106 and backbone ATM link 148 on the ISP side. On the Internet-side of SONET multiplexer 192, a single optical channel may be employed to transport both packet-oriented data and ATM data. However, a SONET multiplexer is an expensive and complex electronic system, costing upwards of fifty thousand dollars ($50,000) or more in some cases and increasing the maintenance burden on the operators. Thus, although the use of a SONET multiplexer theoretically allows ISP operators to avoid paying for separate backbone links to connect to the Internet to accommodate ATM data and packet data, many ISP operators find that the high acquisition cost and additional maintenance burden of the SONET multiplexer makes its purchase difficult to justify.

In view of the foregoing, there are desired improved devices and methods for facilitating transmission of packet data traffic and ATM data traffic on a single communication link.

SUMMARY OF THE INVENTION

The present invention relates to a combined ATM/packet transmission architecture configured for coupling with a mixed data optical fiber carrying both ATM cells and data packets in a time-division multiplexed manner. The combined ATM/packet transmission architecture includes a transmission convergence device (TCD) circuit having a first TCD input port configured to receive first ATM cells and first data packets from the optical fiber. The TCD circuit has a first TCD output bus configured to output second ATM cells and second data packets from the TCD circuit. The second ATM cells and the second data packets include information from the first ATM cells and the first data packets. The combined ATM/packet transmission architecture includes a combined ATM/packet segmentation-and-reassembly (SAR) circuit having a first SAR input bus configured to be coupled to the first TCD output bus of the TCD circuit to receive the second ATM cells and the second data packets, wherein the combined ATM/packet SAR circuit includes a first SAR output port configured to output first mixed data packets from the combined ATM/packet SAR circuit, the first mixed data packets include information from both the second ATM cells and the second data packets.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 shows in accordance with one embodiment of the present invention the combined ATM/packet TCD of FIG. 3 in greater detail.

FIG. 5 shows, in accordance with one embodiment of the present invention, a receive Utopia & POS-PHY interface.

FIG. 6 shows, in accordance with one embodiment of the present invention, a transmit Utopia & POS-PHY interface.

FIG. 7 shows, in accordance with one embodiment of the present invention, a receive POS-PHY interface.

DETAILED DESCRIPTION OF THE PREFERRED EMBODIMENTS

Figure 1A:
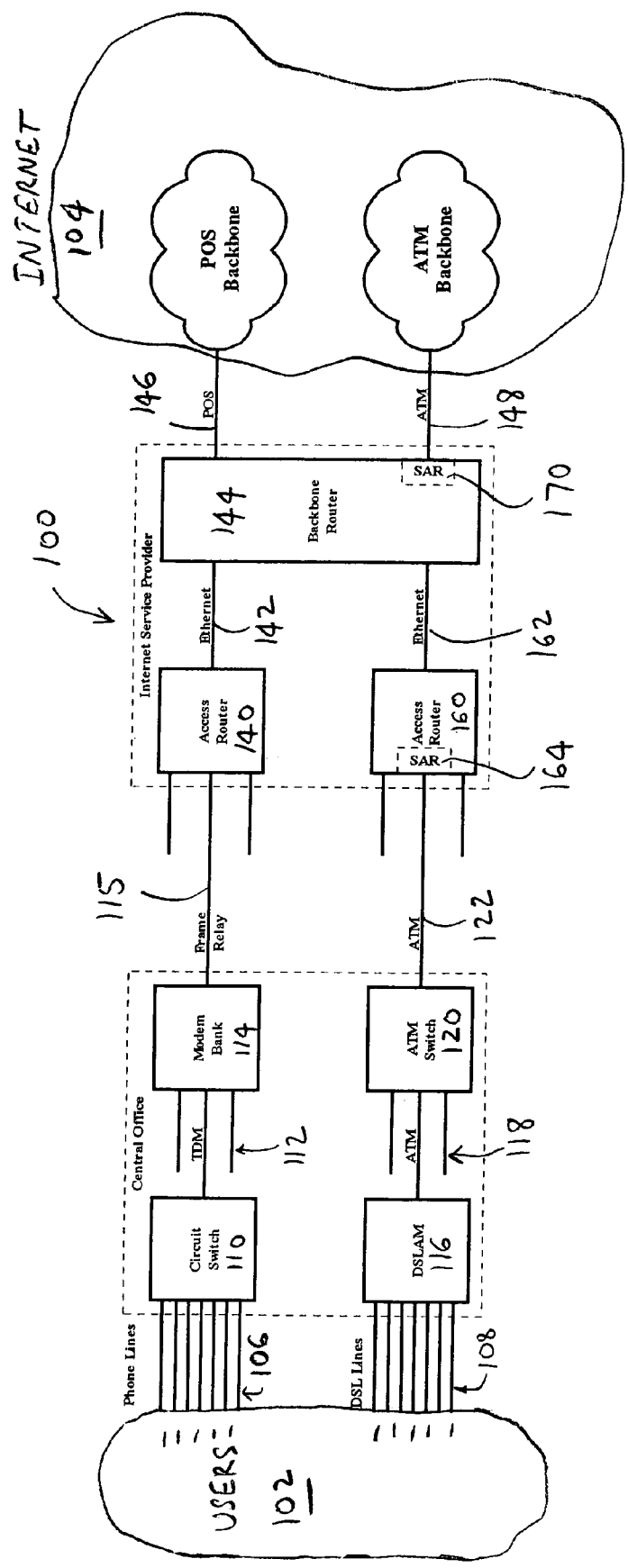
FIG. 1A illustrates an Internet service provider, representing a location in the current network where SAR engines may be found.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is provided a combined ATM/packet transmission architecture, which receives data packets and transmits the received data packets either as ATM cells or as transmitted data packets on a mixed data optical fiber. On the receive side, the combined ATM/packet transmission architecture receives both ATM cells and data packets on the mixed data optical fiber and resolves them into data packets to be received. Since only a single optical fiber is required for transmitting both ATM and packet data traffic, substantial reduction in costs of implementation and operation, as well as complexity, may be achieved. Likewise, on the receive side, since only a single optical fiber is required for receiving both ATM and packet data traffic, substantial reduction in costs of implementation and operation, as well as complexity, may be achieved.

In accordance with one aspect of the present invention, data to be transmitted on the mixed data optical fiber via the combined ATM/packet transmission architecture is typically received first in the form of data packets. Depending on whether the destination of a received data packet requires the eventual traversal of an ATM network or a packet network, the payload of the received data packet is correspondingly parsed and packaged into either ATM cells or data packets to be transmitted via the mixed data optical link to its destination. On the other hand, data received from the mixed data optical link, which may contain both data packets or ATM data cells, is demultiplexed into packet stream(s) and ATM stream(s). The packet stream(s) are then delineated into data packets to be received while the ATM stream(s) are delineated into ATM cells, which are then reassembled into data packets to be received.

In accordance with one aspect of the present invention, the combined ATM/packet transmission architecture includes two main functional blocks: a combined ATM/packet transmission convergence device (TCD) and a modified segmentation and reassembly (SAR) engine. In one preferred embodiment, both of these main functional blocks (e.g., both the combined ATM/packet TCD and the modified SAR engine) are implemented in a single integrated circuit chip. It is recognized by the inventors herein that this is especially important for high speed applications, e.g., OC-192 and above since at higher speeds, the speed of the system bus on a board may be a limiting factor. In another preferred embodiment, these main functional blocks (e.g., both the combined ATM/packet TCD and the modified SAR engine) are implemented in two separate integrated circuit chips. In yet another preferred embodiment, these main functional blocks (e.g., both the combined ATM/packet TCD and the modified SAR engine) are implemented in a plurality network processors. The combined ATM/packet TCD interfaces with the mixed data optical fiber to receive the mixed ATM/packet data stream, to demultiplex the mixed ATM/packet data stream into constituent ATM and packet streams for delineation into ATM cells and data packets respectively. The ATM cells and data packets are then passed onto the modified SAR engine wherein the received ATM cells are reassembled into data packets to be multiplexed into the receive POS-PHY (Packet Over Sonet-Physical layer) signal. On the other hand, data packets received from the combined ATM/packet TCD are multiplexed into the receive POS-PHY signal without the need for reassembly. In either case, the data received via the mixed data optical fiber is converted into data packets and received as such in the receive POS-PHY signal.

On the transmit side, data to be transmitted out on the mixed data optical fiber is received as data packets initially. The modified SAR engine then packages the payload of the received data packet into either ATM cells or data packets to be transmitted depending whether the destination of the received data packet requires the eventual traversal of an ATM network or a packet network. Thereafter, the ATM cells and data packets to be transmitted are forwarded to the combined ATM/packet TCD, which multiplexes them onto the mixed data stream to be transmitted out on the mixed data optical fiber.

Figure 2A:
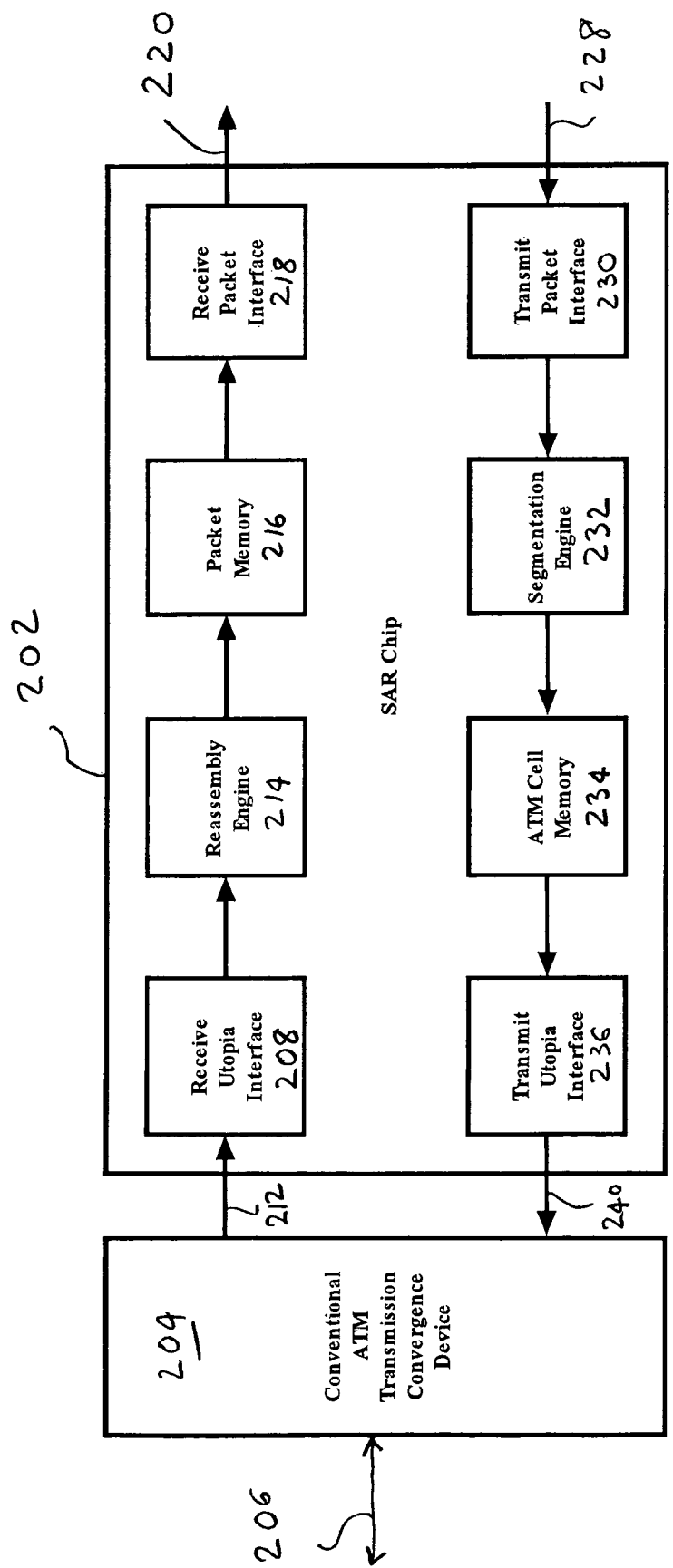
FIG. 2A shows a prior art ATM transmission architecture that includes a SAR engine and a conventional ATM transmission convergence device (TCD).

To facilitate discussion of the combined ATM/packet transmission architecture, FIG. 2A shows a prior art ATM transmission architecture that includes a SAR engine 202 and a conventional ATM transmission convergence device (TCD) 204. With reference to FIG. 2A, SAR engine 202 may represent, for example, SAR 164 while ATM TCD 204 may be implemented as part of access router 160 (or backbone router 144 if SAR engine 202 represents SAR 170 of FIG. 1A). The function of the prior art ATM transmission architecture of FIG. 2A, which is conventional, is to translate between ATM cells and data packets during the transmission process.

In FIG. 2A, ATM cells are received at ATM TCD 204 from an ATM link 206, which may represent, for example, a SONET, a DS3 link, or the like. The main function of ATM TCD 204 is to extract ATM cells from the transmission medium in the receive direction. In the transmit direction, ATM TCD 204 inserts the ATM cells to be transmitted into the electrical signal of the transmission medium, thereby allowing the transmission of the ATM cells over ATM link 206. ATM TCD 204 is conventional and will not be elaborated further here. SAR engine 202 includes a receive Utopia interface 208, which receives ATM cells from ATM TCD 204 via a Utopia bus 212. Utopia buses are well known to those familiar with the ATM art. The received ATM cells are then passed on to a reassembly engine 214, which reassembles the received ATM cells into packets to be received. Packet memory 216 represents a storage location where assembled packets from various streams are buffered for output. Packet memory 216 may also store partially assembled packets that are awaiting the payloads from yet-to-be-received ATM cells to fill them up. Partially assembled packets exist because most packet protocols specify a payload that is substantially larger than the 48-byte payload of the typical ATM cell, and thus multiple ATM cells are required to fill up the payload of such a packet. A receive packet interface (such as POS-PHY) 218 sends the assembled packets onto internal bus 220, which is internal within the router, to permit the assembled packets to be switched to their de nated ports (such as the port that services Ethernet link 162 in FIG. 1A).

On the transmit side, the received data packets are received from an internal bus 228 at a transmit packet interface 230, which are then forwarded to a segmentation engine 232 wherein the payload of a received data packet is mapped onto one or more ATM cells. The ATM cells are then stored at ATM cell memory 234, which acts as a buffer or a shock absorber for high load periods. A transmit Utopia interface 236 then takes the stored ATM cells and forwards them to ATM TCD 204 via a Utopia bus 240 for eventual transmission on ATM link 206.

Figure 2B:
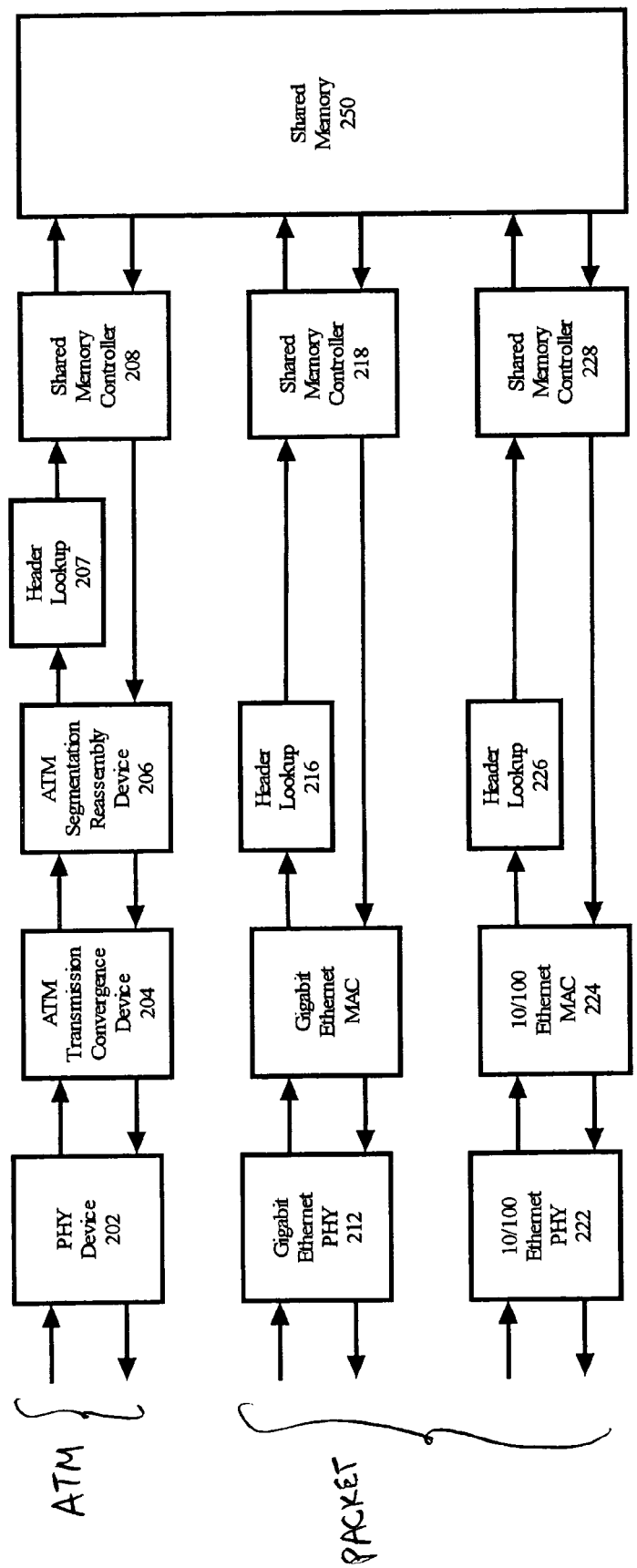
FIG. 2B shows a prior art ATM and packet transmission architecture in which ATM cells are received and transmitted via PHY device, and separately packets are received and transmitted via either a 10/100 Ethernet PHY device or a gigabit Ethernet PHY device.

As can be seen in FIG. 2A, ATM TCD 204 and SAR engine 202 only interface with the ATM network to service packets which need to be transmitted out as ATM cells on ATM link 206 or to receive ATM cells from ATM link 206 for conversion to received packets. For the router to interface with the packet network, additional circuitry and another set of optical fibers (for transmitting and receiving packets) is involved. For additional background information, FIG. 2B shows a prior art ATM and packet transmission architecture in which ATM cells are received and transmitted via PHY device 202, and separately packets are received and transmitted via either 10/100 Ethernet PHY 222 or gigabit Ethernet PHY 212.

Figure 3:
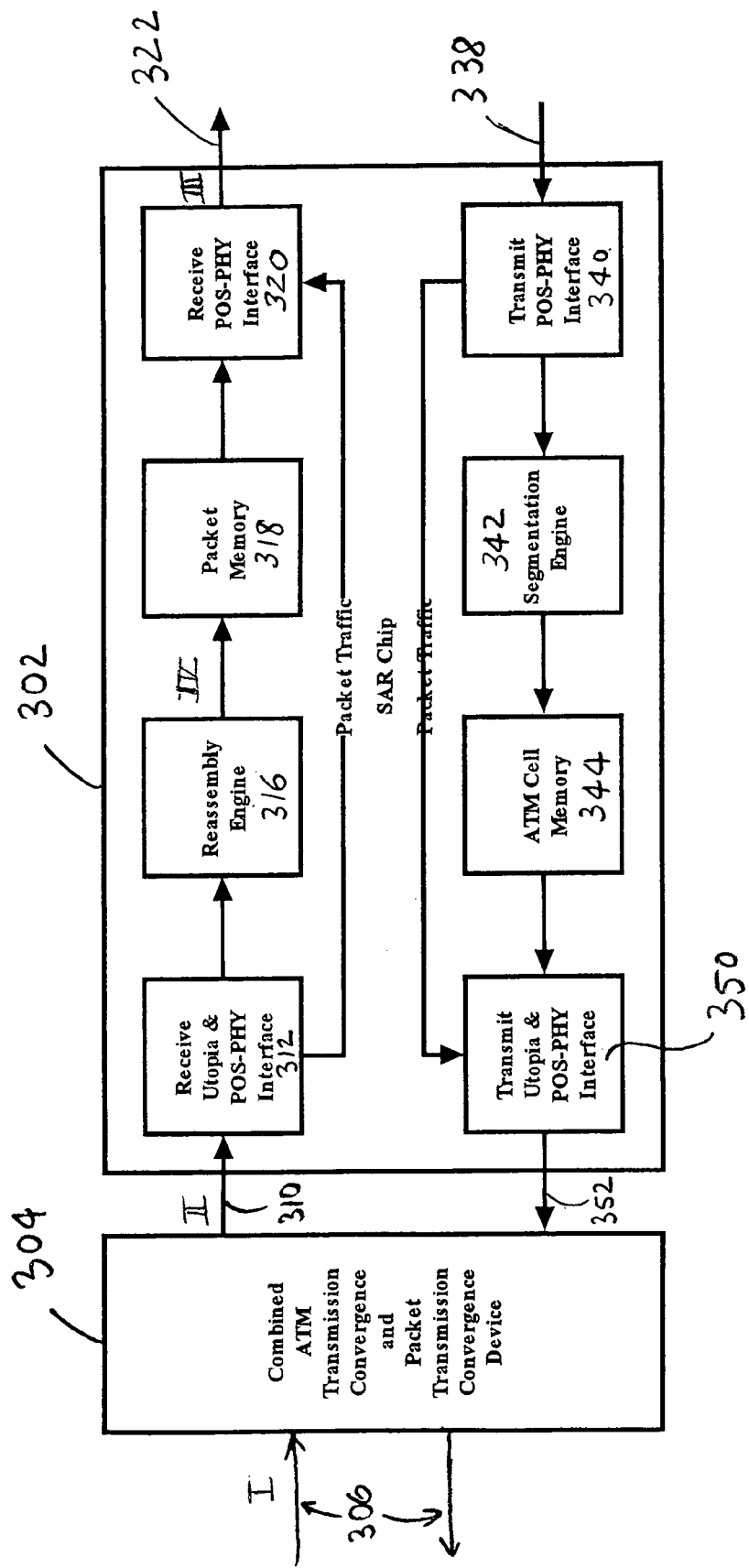
FIG. 3 shows the inventive combined ATM/packet transmission architecture that includes a modified SAR and a combined ATM/packet transmission convergence device to permit both the ATM data traffic and packet data traffic to be merged on a mixed data optical fiber.

Referring now to FIG. 3, the combination of the modified SAR 302 and the combined ATM/packet TCD 304 permit both the ATM data traffic and packet data traffic to be merged on a mixed data optical fiber 306. Throughout this discussion, it should be kept in mind that data transmission through optical fibers takes place in a single direction only and typically, two optical fibers are required to transmit and receive data (i.e., one for each direction). On the receive side, the mixed ATM/packet data is received into combined ATM/packet TCD 304, which demultiplexes the received data streams into the constituent ATM and packet streams. The constituent streams are then delineated into ATM cells and packets respectively, which are then transmitted via a modified Utopia bus 310 to modified SAR 302.

At modified SAR 302, the ATM cells and packets are received by a receive combined Utopia & POS-PHY interface 312, which separates the traffic into ATM data traffic and packet traffic. Receive Utopia & POS-PHY interface 312 is discussed further in connection with a FIG. 5 below. The ATM traffic is passed onto a reassembly engine 316 and a packet memory 318 for reassembly into packets and temporary storage in the manner discussed earlier in connection with FIG. 2A. On the other hand, the packet traffic is passed directly to a receive POS-PHY interface 320. As shown in FIG. 3, this POS-PHY interface 320 also receives the reassembled packets from packet memory 318. This POS-PHY interface 320 then sends the packets onto an internal bus 322, which is internal within the router, to permit the packets to be switched to their designated ports (such as the port that services Ethernet link 162 in FIG. 1A). Receive POS-PHY interface 320 is discussed further in connection with a FIG. 7 below.

On the transmit side, data packets are received at a transmit POS-PHY interface 340 via an internal bus 338. Transmit POS-PHY interface 340 then determines whether the data within the received data packet should be transmitted as ATM cells or as data packet(s) to its destination. Transmit POS-PHY interface 340 may make this determination by a variety of techniques. For example, transmit POS-PHY interface 340 may be in communication with a bus master that is coupled to internal bus 338. The bus master may be able to inform transmit POS-PHY interface 340 if the packet received should be transmitted as ATM cells or as data packet(s), and if the packet is to be transmitted as ATM cells, what the header information should be for the ATM cells. Alternatively or additionally, transmit POS-PHY interface 340 may be able to ascertain the destination of the packet from the content of the packets (such as by examining the header of an IP data packet), and use that information to ascertain whether the destination requires a traversal of either an ATM network or a packet network and act accordingly. Other techniques may also be employed. Transmit POS-PHY interface 340 is discussed further in connection with FIG. 8 below.

Packets destined for transmission as ATM cells are passed onto a segmentation engine 342 where they will be segmented and mapped onto one or more ATM cells. The ATM cells are then buffered at ATM cell memory 344 for transmission to combined ATM/packet TCD 304 via a transmit Utopia & POS-PHY interface 350 and a modified Utopia bus 352. On the other hand, packet traffic is passed from transmit POS-PHY interface 340 onto transmit Utopia & POS-PHY interface 350 for transmission to combined ATM/packet TCD 304 via modified Utopia bus 352. In combined ATM/packet TCD 304, the ATM cells and packets are multiplexed onto the electrical signal of the transmission standard on mixed data optical fiber 306 (e.g., DS3, OC48, OC192, etc.) for transmission out on the mixed data optical fiber.

FIG. 4 shows in accordance with one embodiment of the present invention combined ATM/packet TCD 304 of FIG. 3 in greater detail. On the receive side, the mixed ATM and packet data streams are received initially by a receive framer 402, which frames up the electrical signal to ascertain where the data resides in the electrical signal. Thereafter, a TDM demultiplexer 404 demultiplexes the received mixed data streams into ATM streams and packet streams in accordance with a time division demultiplex scheme. The ATM data streams are received by a cell delineation circuit 408, which finds out the beginning and end of the cells, obtain the cells, and perform any error checking such as CRC error checking. The packet data streams are received by a packet delineation circuit 410, which also delineates packets, obtain the packets, and perform any error checking such as CRC error checking. The ATM cells and data packets are then temporarily stored in a ATM cell memory 412 and a packet memory 414 respectively.

Thereafter, the ATM cells and data packets are output by receive Utopia & POS-PHY interface 416 via modified Utopia bus 310 (also shown in FIG. 3) to be received by receive Utopia & POS-PHY interface 312 of FIG. 3. Receive Utopia & POS-PHY interface 416 is discussed further in connection with FIG. 6 below. Preferably associated with each ATM cell or data packet transmitted from receive Utopia & POS-PHY interface 416 (of FIG. 4) to receive Utopia & POS-PHY interface 312 (of FIG. 3) is a signal which indicates whether the data received by receive Utopia & POS-PHY interface 312 is an ATM cell or a data packet to permit receive Utopia & POS-PHY interface 312 to handle the data appropriately (i.e., to perform reassembly or to pass directly to receive Utopia & POS-PHY interface 320 of FIG. 3).

On the transmit side, the ATM cells and data packets received from transmit Utopia & POS-PHY interface 350 of FIG. 3 are received by transmit Utopia & POS-PHY interface 450 of FIG. 4. Transmit Utopia & POS-PHY interface 450 is discussed further in connection with FIG. 5 below. Transmit Utopia & POS-PHY interface 450 ascertains whether the received data is ATM or packet and passes the ATM cells to an ATM cell memory 452, and the packets to a packet memory 454. Thereafter, a cell assembler 456 performs insertion of the ATM cells from ATM cell memory 452 into the TDM stream while a packet assembler 458 likewise performs insertion of the packets from packet memory 454 into the TDM stream. If there is no active cell or packet, an idle cell or packet may be inserted. A TDM multiplexer 460 multiplexes the ATM stream from cell assembler 456 and the packet stream from packet assembler 458 into a single stream on bus 462, which is then mapped by a transmit framer 464 into the electrical signal of the mixed data optical fiber 306 for transmission onward.

FIG. 5 shows, in accordance with one embodiment of the present invention, a receive Utopia & POS-PHY interface 502, representing one suitable for use in block 312 of FIG. 3 or block 450 of FIG. 4. With reference to FIG. 5, both ATM cells and packets are received at a terminate receive Utopia & POS-PHY signal circuit 504. The ATM cells and packets may be received from, for example, the combined ATM/packet TCD 304 of FIG. 3 via the modified Utopia bus 320.

Terminate receive Utopia & POS-PHY signal circuit 504 acts to terminate the electrical signals as part of the Utopia standard. However, the modified Utopia bus preferably includes an additional signal that indicates whether the data received is an ATM cell or a data packet. This information is obtained by, for example, receive Utopia & POS-PHY interface circuit 416 within combined ATM/packet TCD 304 when it receives either an ATM cell or a data packet from ATM cell memory 412 or packet memory 414.

After termination, this information along with the received data is passed on to circuit block 506, which determines whether an ATM cell or a data packet is received and send the ATM cell or data packet to its respective forwarding circuits 508 or 510. In the case of an ATM cell, forward circuit 508 then forwards the ATM cell to, for example, reassembly engine 316. On the other hand, in the case of a data packet, forward circuit 510 then forwards the data packet to, for example, receive POS-PHY interface 320 for eventual forwarding via internal bus 322.

FIG. 6 shows, in accordance with one embodiment of the present invention, a transmit Utopia & POS-PHY interface 602, representing one suitable for use in block 350 of FIG. 3 or block 416 of FIG. 4. With reference to FIG. 6, ATM cells and packets are received at ATM storage circuit 604 and packet storage circuit 606. The packets and ATM cells may be received from, for example, the transmit POS-PHY interface 340 or from ATM cell memory 344. Thereafter, a transmit gating circuit 608 then decides whether an ATM cell or a packet should be output. The decision may be made based on, for example, information received from combined ATM/packet TCD 304, which provides information about whether ATM cell memory 452 or packet memory 454 is ready to accept another ATM cell or packet respectively. By way of example, both of whether ATM cell memory 452 or packet memory 454 may be polled and two signals may be furnished via the modified Utopia interface 352 from combined ATM/packet TCD 304 to furnish the desired information to transmit gating circuit 608 of transmit Utopia POS-PHY interface 350. Terminate transmit Utopia & POS-PHY signal circuit 504 acts to terminate the electrical signals substantially in accordance with the Utopia standard with modified Utopia bus 612 as shown.

FIG. 7 shows, in accordance with one, a receive POS-PHY interface 702, representing one suitable for use in block 320 of FIG. 3. With reference to FIG. 7, packets reassembed from ATM cells and packets that are received as packets and does not need translation are received into storage circuit 704 and storage circuit 706 respectively as shown. These packets may be received from, for example, from packet memory 318 or the receive Utopia & POS-PHY interface 312. Thereafter, a multiplexing circuit 708 multiplexes the received ATM cells and packets into a single stream to be transmitted out to the internal bus 712 (such as internal bus 322 of FIG. 3). Multiplexing may be done in accordance with, for example, a time-division multiplex scheme. Terminate receive POS-PHY signal circuit 710 acts to terminate the electrical signals substantially in accordance with the POS-PHY standard scheme for transmission.

Figure 8:
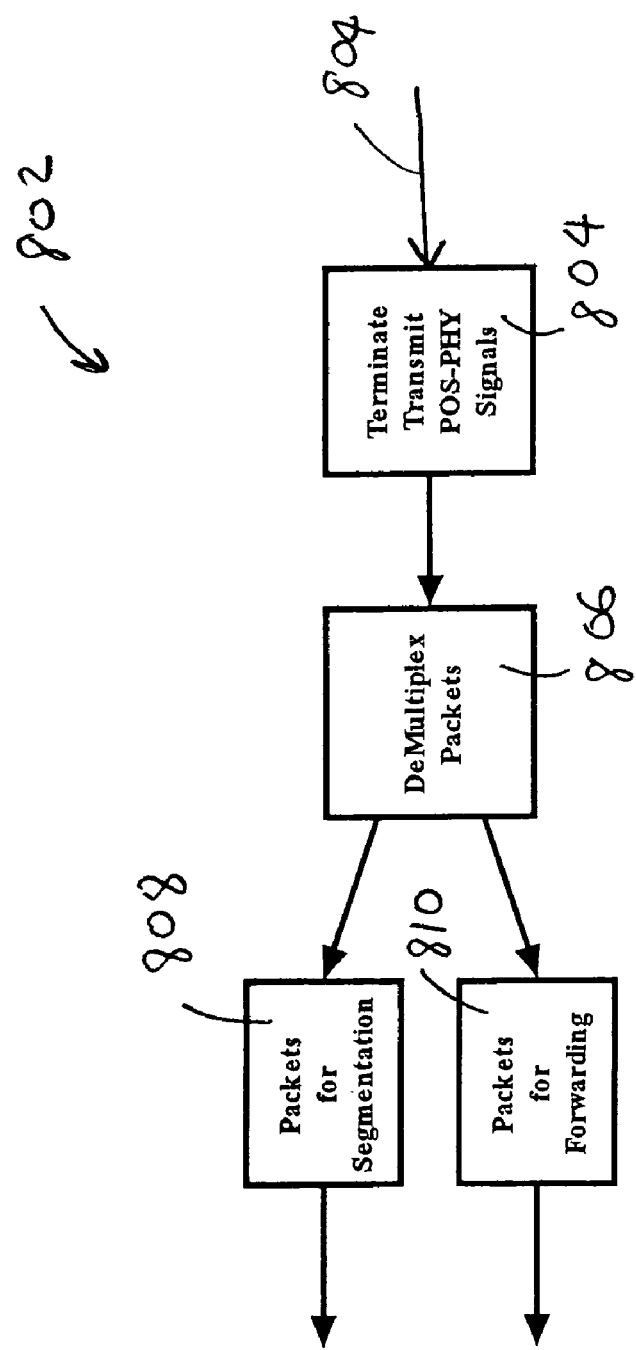
FIG. 8 shows, in accordance with one embodiment of the present invention, a transmit POS-PHY interface.

FIG. 8 shows, in accordance with one, a transmit POS-PHY interface 802, representing one suitable for use in block 340 of FIG. 3. With reference to FIG. 8, the packets are received from the internal bus 804 into a termination circuit 804, which terminates the electrical signals as part of the POS-PHY standard scheme. Thereafter, the packets received into demultiplexing circuit 806, which demultiplexes the packets into streams destined for the ATM network or the packet network. Demultiplexing may be performed using any number of demultiplexing techniques, including those discussed earlier in connection with block 340 of FIG. 3.

After demultiplexing, packets destined for the ATM network are forwarded to a buffer block 808 for transmission to the segmentation engine (e.g., segmentation engine 342 of FIG. 3). Once segmented into ATM cells, the ATM cells are then forwarded to a transmit Utopia & POS-PHY interface (such as transmit Utopia & POS-PHY interface 350 of FIG. 3) for eventual transmission to the combined ATM/packet TCD. On the other hand, packets destined for the packet network are forwarded to a buffer block 810 for transmission to a transmit Utopia & POS-PHY interface (such as transmit Utopia & POS-PHY interface 350 of FIG. 3) for eventual transmission to the combined ATM/packet TCD.

Table 1 below shows the signals associated with one embodiment of the modified Utopia bus.

TABLE 1

Signals for modified Utopia Interface

| Utopia | POS-PHY | Modified Utopia | Description |
| --- | --- | --- | --- |
|  |  | POS/ATM | Mode selection |
| TxClk | TxClk | TxClk | Transmit Clock |
| TxAddr | TxAddr | TxAddr | Transmit Address |
| TxData | TxData | TxData | Transmit Data |
|  | TxMod | TxMod | Byte Enables |
| TxSOC | TxSOP | TxBgn | Transmit Start of Cell/Packet |
|  | TxEOP | TxEnd | Transmit End of Cell/Packet |
| TxPrty | TxPrty | TxPrty | Transmit Parity |
| TxEnb | TxEnb | TxEnb | Transmit Select/Enable |
| TxErr | TxErr | TxErr | Transmit Error |
| TxCA |  | TxCA | Transmit Cell Available |
|  | TxPA | TxPA | Transmit Packet Available |
| RxClk | RxClk | RxClk | Receive Clock |
| RxAddr | RxAddr | RxAddr | Receive Address |
| RxData | RxData | RxData | Receive Data |
| RxMod | RxMod | RxMod | Byte Enables |

TABLE 1-continued

Signals for modified Utopia Interface

| Utopia | POS-PHY | Modified Utopia | Description |
| --- | --- | --- | --- |
| RxVal | RxVal | RxVal | Receive Data Valid |
| RxSOC | RxSOP | RxBgn | Receive Start of Cell/Packet |
|  | RxEOP | RxEnd | Receive End of Cell/Packet |
| RxPrty | RxPrty | RxPrty | Receive Parity |
| RxEnb | RxEnb | RxEnb | Receive Select/Enable |
| RxErr | RxErr | RxErr | Receive Error |
| RxCA |  | RxCA | Receive Cell Available |
|  | RxPA | RxPA | Receive Packet Available |

As can be appreciated from the foregoing, the inventive combined ATM/packet transmission architecture permits both ATM traffic and packet traffic to be sent over a single optical fiber and received over another single optical fiber. This is advantageous in view of technologies that broaden the bandwidth of existing optical fibers such as DWDM (dense wave division multiplex).

Furthermore, it is expected that the volume of data carried by packet-centric networks will change over time relative to the amount of data carried by ATM networks. For network operators, the inventive combined ATM/packet transmission architecture furnishes a seamless migration path as the relative volume of data traffic between the two networks changes. By way of example, as customers migrate toward packet-oriented networking equipment over time, the volume of packet-oriented traffic may increase relative to the volume of ATM traffic may increase over time. In this case, the receive and the transmit Framers in the combined ATM/packet TCD may be appropriately configured to handle different traffic load mixes over the mixed data optical fiber.

Still further, the receive and the transmit Framers may be appropriately configured to provision the mixed data optical fiber such that only a portion of the maximum bandwidth is employed for data transmission. In a tariff-based regime wherein operators may be required to pay for different classes of traffic, different types of traffic (e.g., ATM vs. packet vs. SONET), and/or the actual bandwidth employed or reserved, such flexible provisioning capability may be highly advantageous and/or desired by network operators. This is done by setting software registers which allocate each TDM slot to either ATM or packet traffic.

Figure 1B:
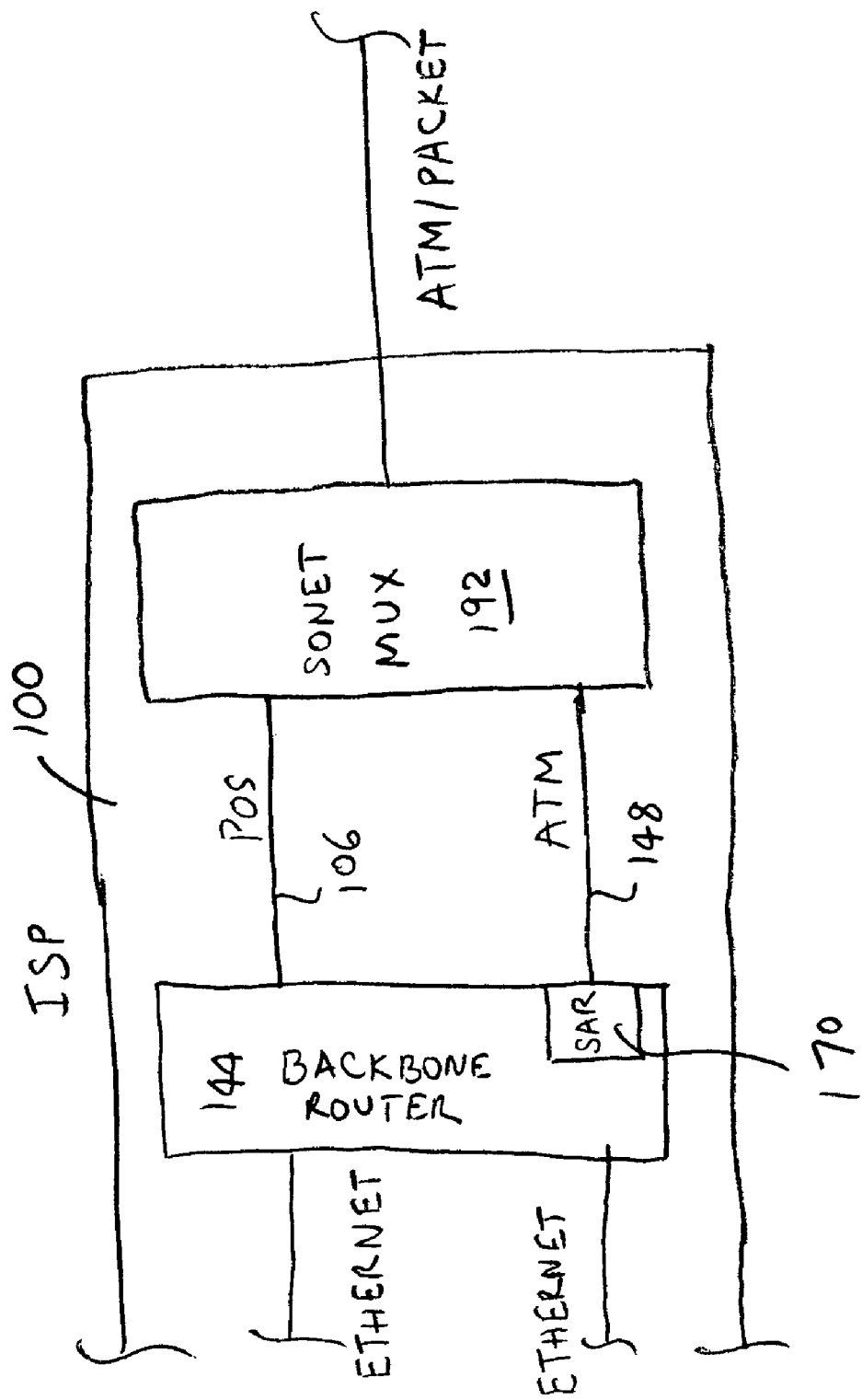
FIG. 1B shows an architecture that includes a SONET multiplexer for combining ATM and packets on a fiber.

In a preferred embodiment, the modified SAR is implemented as a single chip in order to handle high speed optical data received and/or transmitted via the optical fibers. Although the single chip implementation may seem less flexible than a network processor approach and requires extensive engineering on a single die, the single chip implementation is particularly advantageous since at high speeds, a multi-ICs approach for combining ATM and packet data can become almost impossible to implement because the backplane of a board containing the multiple ICs becomes a speed bottleneck. It is also preferred that the inventive architecture for combining ATM/data packets be implemented into a router (such as a backbone router) so that the router can now perform the function of aggregating both data packets and ATM cells. With reference to FIG. 1, the modified SAR can be implemented in place of SAR 170, and a single optical fiber coupled thereto can serve to transmit both ATM cells to the ATM backbone and data packets to the POS backbone, and another dingle optical fiber coupled thereto can serve to receive both ATM cells from the ATM backbone and data packets from the POS backbone.

The inventive combined ATM/packet transmission architecture also renders it unnecessary to purchase and maintain a SONET multiplexer system, which is typically a complex and expensive piece of equipment, when ISP operators wish to combine ATM traffic and packet traffic on a single optical fiber. Besides eliminating the SONET multiplexer acquisition cost, the inventive ATM/packet transmission architecture also reduces the number of system boxes that an ISP has to maintain and upgrade, thereby leading to reduced operation cost.

While this invention has been described in terms of several preferred embodiments, there are alterations, permutations, and equivalents, which fall within the scope of this invention. By way of example, although data packets out of the SAR is outputted in the packet-over-SONET format, they may also be outputted as packet-over-DWDM. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A combined ATM/packet transmission architecture configured for coupling with a mixed data optical fiber carrying both ATM cells and data packets, comprising:
   a transmission convergence device (TCD) circuit having a first TCD input port configured to receive first ATM cells and first data packets from said optical fiber, said TCD circuit having a first TCD output bus configured to output second ATM cells and second data packets from said TCD circuit, said second ATM cells and said second data packets include information from said first ATM cells and said first data packets;
   a combined ATM/packet segmentation-and-reassembly (SAR) circuit having a first SAR input bus configured to be coupled to said first TCD output bus of said TCD circuit to receive said second ATM cells and said second data packets, wherein said combined ATM/packet SAR circuit includes a first SAR output port configured to output first mixed data packets from said combined ATM/packet SAR circuit, said first mixed data packets include information from both said second ATM cells and said second data packets;
   wherein said SAR circuit includes a first SAR input port configured for receiving second mixed data packets, said second mixed data packets including both packets destined for ATM-mode transmission and packets destined packet-mode transmission, said SAR circuit includes a first SAR output bus configured for outputting third ATM cells and third data packets, said third ATM cells and said third data packets includes information from said second mixed data packets.

2. The combined ATM/packet transmission architecture of claim 1 wherein said ATM cells and data packets are multiplexed on said optical fiber in accordance with a time-division multiplexing scheme.

3. The combined ATM/packet transmission architecture of claim 1 wherein said first TCD output bus is a modified Utopia bus.

4. The combined ATM/packet transmission architecture of claim 1 wherein said first SAR input bus is a modified Utopia bus.

5. A segmentation-and-reassembly (SAR) integrated circuit including:
   first interface circuitry adapted to receive first packets, said first packets including data destined for an ATM (Asynchronous Transfer Mode) network and a packet network, said first interface circuitry further includes logic for ascertaining whether a given packet received at said first interface circuitry is destined for said ATM network or said packet network;
   a segmentation circuit coupled to an output of said first interface circuitry, said first interface circuitry is configured to forward second packets to said segmentation circuit if said second packets are ascertained to be destined for said ATM network, said second packets representing a subset of said first packets, said segmentation circuit is configured to disassemble said second packets into first ATM cells;
   second interface circuitry coupled to another output of said first interface circuitry, said first interface circuitry is configured to forward third packets to said second interface circuitry if said third packets are ascertained to be destined for said packet network, said third packets representing a subset of said first packets; and
   an ATM cell memory coupled to said segmentation circuit and said second interface circuitry, said ATM cell memory being configured to buffer said first ATM cells for output via said second interface circuitry, wherein said second interface circuitry is also configured for outputting said third packets, said third packets and said first ATM cells being output via a common bus.

6. The SAR integrated circuit of claim 5 wherein said first interface circuitry is a POS-PHY interface.

7. The SAR integrated circuit of claim 5 wherein said second interface circuitry is a modified Utopia interface.

8. The SAR integrated circuit of claim 5, wherein said first interface circuitry is a POS-PHY interface, and wherein said logic within said first interface circuitry ascertains whether said given packet is destined for said ATM network or said packet network by examining a header of the packet.

9. The SAR integrated circuit of claim 8, wherein the POS-PHY receives said given packet via a bus, said bus being a bus internal to a router.

* * * * *